US012735137B1

(12) United States Patent
Wu

(10) Patent No.: US 12,735,137 B1
(45) Date of Patent: Sep. 15, 2026

(54) CIRCUIT COMBINING FUNCTIONS OF CHARGING AND ACTIVATING MOTORCYCLE SCREEN PROJECTION WITHOUT AN ADDITIONAL WEARABLE DEVICE

(71) Applicant: Wenhui Wu, Shanghai (CN)

(72) Inventor: Wenhui Wu, Shanghai (CN)

(*) Notice: Subject to any disclaimer, the term of this patent is extended or adjusted under 35 U.S.C. 154(b) by 0 days.

(21) Appl. No.: 19/435,444

(22) Filed: Dec. 29, 2025

(30) Foreign Application Priority Data

Dec. 15, 2025 (CN) ........................ 202522661547.2

(51) Int. Cl.
*B62J 50/22* (2020.01)
*B60R 16/03* (2006.01)
*B62J 45/10* (2020.01)
*B62J 50/21* (2020.01)
*B62J 50/23* (2020.01)
*H02J 7/24* (2006.01)

(52) U.S. Cl.
CPC ............... *B62J 50/22* (2020.02); *B60R 16/03* (2013.01); *B62J 45/10* (2020.02); *B62J 50/225* (2020.02); *B62J 50/23* (2020.02); *H02J 7/24* (2013.01)

(58) Field of Classification Search
CPC ... B62J 50/22; B62J 50/23; B62J 45/10; B62J 50/225; B60R 16/03; H02J 7/24
USPC ......................................................... 340/901
See application file for complete search history.

(56) References Cited

U.S. PATENT DOCUMENTS 6,574,126 B1 * 6/2003 Gionet, Jr. ............... A42B 3/30 363/125
2013/0104297 A1 * 5/2013 Silva .................... A42B 3/0453 2/422
2015/0185545 A1 * 7/2015 Tetsuka .................. B60K 35/10 180/90
2018/0007994 A1 * 1/2018 Boesen ................ A42B 3/0466
2018/0334216 A1 * 11/2018 Montez .................. B62J 50/225
2019/0261704 A1 * 8/2019 Sonnenberg ........... H05B 3/342
2020/0055486 A1 * 2/2020 Keating .................. B60R 25/20
2022/0151328 A1 * 5/2022 Van Cleve ............. A42B 3/044
2023/0147144 A1 * 5/2023 Avila ........................ E05D 5/04 340/426.1

* cited by examiner

Primary Examiner — Zhen Y Wu
(74) *Attorney, Agent, or Firm* — All West Law Group, PLLC; Aaron Powell

(57) ABSTRACT

A circuit combining functions of charging and activating motorcycle screen projection without an additional wearable device includes a jointer J1, a jointer J2, a power control circuit and a Bluetooth circuit; the jointer J1 is electronically connected to a charging port of the motorcycle; an input end of the power control circuit is electrically connected to the charging port of the motorcycle; the power control circuit has two voltage-output ends, one end of the two voltage-output ends is electrically connected to the Bluetooth circuit, another end of the two voltage-output ends is electrically connected to the jointer J2; the jointer J2 is connected to a mobile device. Thanks to the Bluetooth circuit, a rider can activate the motorcycle screen projection without wearing Bluetooth earphones. In addition, the rider can have his/her mobile device recharged via the jointer J2 directly.

6 Claims, 9 Drawing Sheets

CIRCUIT COMBINING FUNCTIONS OF CHARGING AND ACTIVATING MOTORCYCLE SCREEN PROJECTION WITHOUT AN ADDITIONAL WEARABLE DEVICE

CROSS-REFERENCE TO RELATED APPLICATIONS

The present application claims the benefit of Chinese Patent Application No. 2025226615472 filed on Dec. 15, 2025, the contents of which are hereby incorporated by reference.

TECHNICAL FIELD

The present invention belongs to the technical field of screen projection connecting of a motorcycle, and in particular relates to a circuit combining functions of charging and activating motorcycle screen projection without an additional wearable device.

TECHNICAL BACKGROUND

With the improvement of the intelligent level of a motorcycle, the function of motorcycle screen projection has become one of the important configurations of a motorcycle. Once a phone is connected with the motorcycle screen projection, a rider can directly control the phone via the motorcycle screen projection, which helps the rider use the navigation service and play music directly via the motorcycle screen projection without taking out the phone.

At present, most motorcycles screen projection function such as Car Play or Android Auto, when riders want to activate the function, he/she must use Bluetooth earphones to connect with the motorcycle. When riding a motorcycle, the rider also needs to wear a safety helmet. As a result, it is uncomfortable and troublesome for the rider to wear Bluetooth earphones and a safety helmet at the same time. Sometimes, the rider might forget to carry the Bluetooth earphones, then he/she fails to activate the motorcycle screen projection function. In addition, if the Bluetooth earphones run out of battery, then the motorcycle screen projection function will be close immediately.

INVENTION CONTENT

In order to overcome the shortcomings of the prior art, the present invention provides a circuit combining functions of charging and activating motorcycle screen projection without an additional wearable device; the circuit includes a Bluetooth circuit, which takes the place of the Bluetooth earphones. The rider can activate the motorcycle screen projection function without wearing the Bluetooth earphones; at the same time, the rider can have the mobile device connected to the jointer J2 to make the mobile device get charged.

The technical solution adopted by the present invention for solving the technical problem is:

A circuit combining functions of charging and activating motorcycle screen projection without an additional wearable device, comprises a jointer J1, a jointer J2, a power control circuit and a Bluetooth circuit; the jointer J1 is electrically connected to a charging port of the motorcycle; an input end of the power control circuit is electrically connected to the charging port of the motorcycle; the power control circuit has two voltage output ends; one of the two voltage output ends is electrically connected to the Bluetooth circuit, another of the two voltage output ends is electrically connected to the jointer J2 and a mobile device connects to the jointer J2 to get charged.

Further, the circuit further comprises a Power Delivery (PD) fast-charging circuit and a communication detection circuit; the PD fast-charging circuit comprises a fast-charging chip U3; a pin A5 of the jointer J1 is connected to one end of a first capacitor-resistor (RC) parallel circuit; another end of the first RC parallel circuit is connected to a pin 1 of the fast-charging chip U3; a pin B5 of the jointer J1 is connected to one end of a second RC parallel circuit; another end of the second RC parallel circuit is connected to a pin 16 of the fast-charging chip U3; a pin 5 and a pin 6 of the fast-charging chip U3 are connected to a power control circuit; a pin 7 and a pin 9 of the fast-charging chip U3 are connected to a communication detection circuit; pin 10 to pin 12 of the fast-charging chip U3 are connected to one end of a third RC parallel circuit; another end of the third RC parallel circuit is connected to the pin A5 of the jointer J2.

Further, the communication detection circuit comprises a field effect transistor Q3; a source electrode of the field effect transistor Q3 is grounded; a gate electrode of the field effect transistor Q3 is connected to a pin 9 of the fast-charging chip U3; a drain electrode of the field effect transistor Q3 is connected to a pin 7 of the fast-charging chip U3.

Further, the power control circuit comprises a field effect transistor Q1, a field effect transistor Q2, a field effect transistor Q4, a field effect transistor Q7, a resistor R7 and a resistor R14; a source electrode of the field-effect transistor Q1 is connected to a charging port of the motorcycle screen projection; a drain electrode of the field-effect transistor Q1 is connected to a plurality of power supply pins of the jointer J2; a gate electrode of the field-effect transistor Q1 is connected to a drain electrode of the field-effect transistor Q7; a source electrode of the field-effect transistor Q7 is grounded; a gate electrode of the field-effect transistor Q7 is connected to a pin 6 of the fast-charging chip U3; a resistor R14, the source electrode and the gate electrode of the field-effect transistor Q1 are connected in parallel; a source electrode of the field-effect transistor Q2 is connected to the charging port of the motorcycle screen projection; a drain electrode of the field-effect transistor Q2 is connected to the Bluetooth circuit; a gate electrode of the field-effect transistor Q2 is connected to a drain electrode of the field-effect transistor Q4; a source electrode of the field effect transistor Q4 is grounded; a gate electrode of the field effect transistor Q4 is connected to a pin 5 of the fast-charging chip U3; a resistor R7 is connected in parallel to the source electrode and the gate electrode of the field effect transistor Q2.

Further, the Bluetooth circuit comprises a buck regulator U2, a Bluetooth chip U1, a crystal oscillator Y1, a radio frequency (RF) front-end chip U4 and a light-emitting diode (LED) D1; a pin 3 of the buck regulator U2 is connected to the power control circuit; a pin 2 of the buck regulator U2 is connected to a pin 4 of the Bluetooth chip U1; a pin 1 of the buck regulator U2 is grounded; a pin 1 of the Bluetooth chip U1 is connected to the LED D1, pin 10 and pin 11 of the Bluetooth chip U1 are connected to a crystal oscillator Y1; a pin 9 of the Bluetooth chip U1, a resistor R6 and the RF front-end chip U4 are connected in series.

Further, a power detection circuit comprises a resistor R1, a resistor R18 and a resistor R21; one end of the resistor R1 is grounded, another end of the resistor R1 is connected to pin A7 and pin B7 of the jointer J1; one end of the resistor R18, a resistor R24 and the drain electrode of the field effect transistor Q3 are connected in series; another end of the he resistor R18 is connected to a resistor R21 and then is grounded; a pin A6 and a pin B6 of the jointer J1 are connected to an intermediate node between the resistor R18 and the resistor R21.

The beneficial effects of the present invention are as follows:

The present invention provides a circuit combining functions of charging and activating motorcycle screen projection without an additional wearable device. A Bluetooth circuit is arranged to replace the role of Bluetooth earphones to activate the motorcycle screen projection function. In this way, a rider can activate the motorcycle screen projection function without wearing Bluetooth earphones; the rider can select a Bluetooth wireless connection method to connect a mobile device with the motorcycle, or the rider can select a wired connection method to connect a mobile device with the motorcycle, in details, the rider can have the charging port of the motorcycle connected to the jointer J1 to activate the motorcycle screen projection function, and have the mobile device connected to the jointer J2 to get the mobile device recharged.

DETAILED DESCRIPTION OF THE EMBODIMENTS

Figure 1:
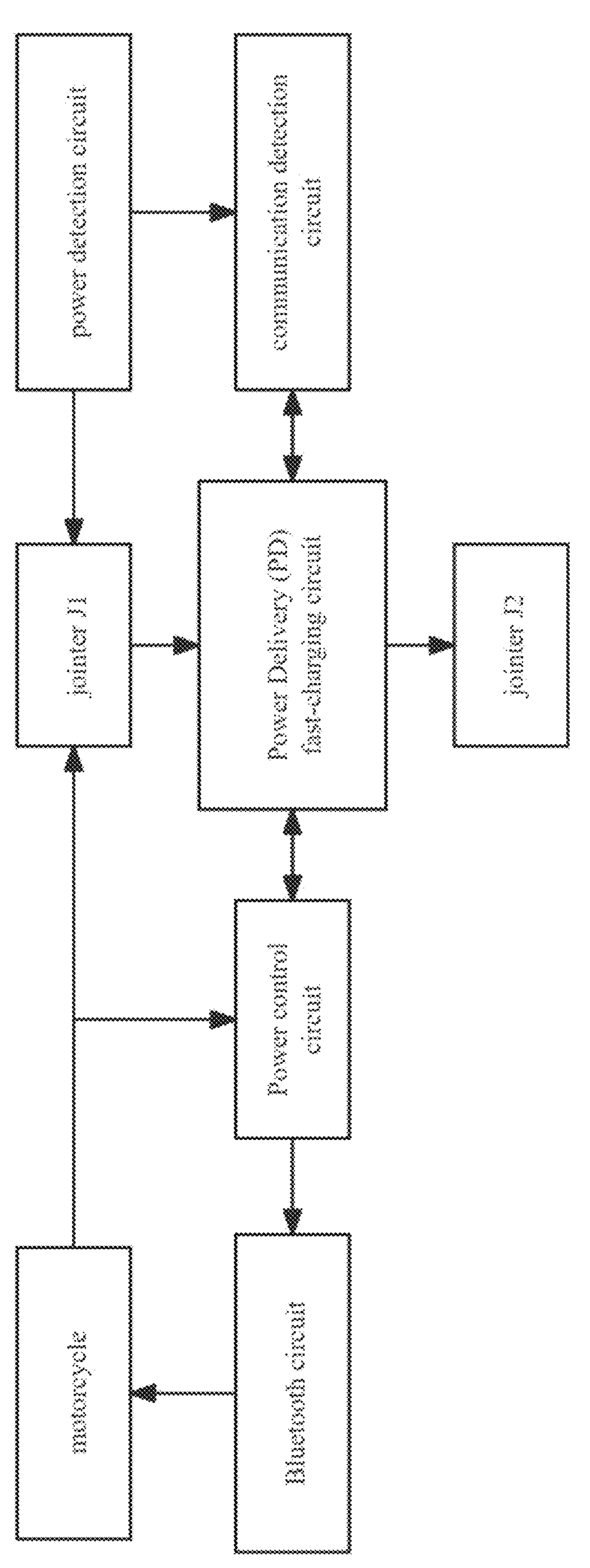
FIG. 1 is a diagram showing a circuit combining functions of charging and activating motorcycle screen projection without an additional wearable device.
Figure 2:
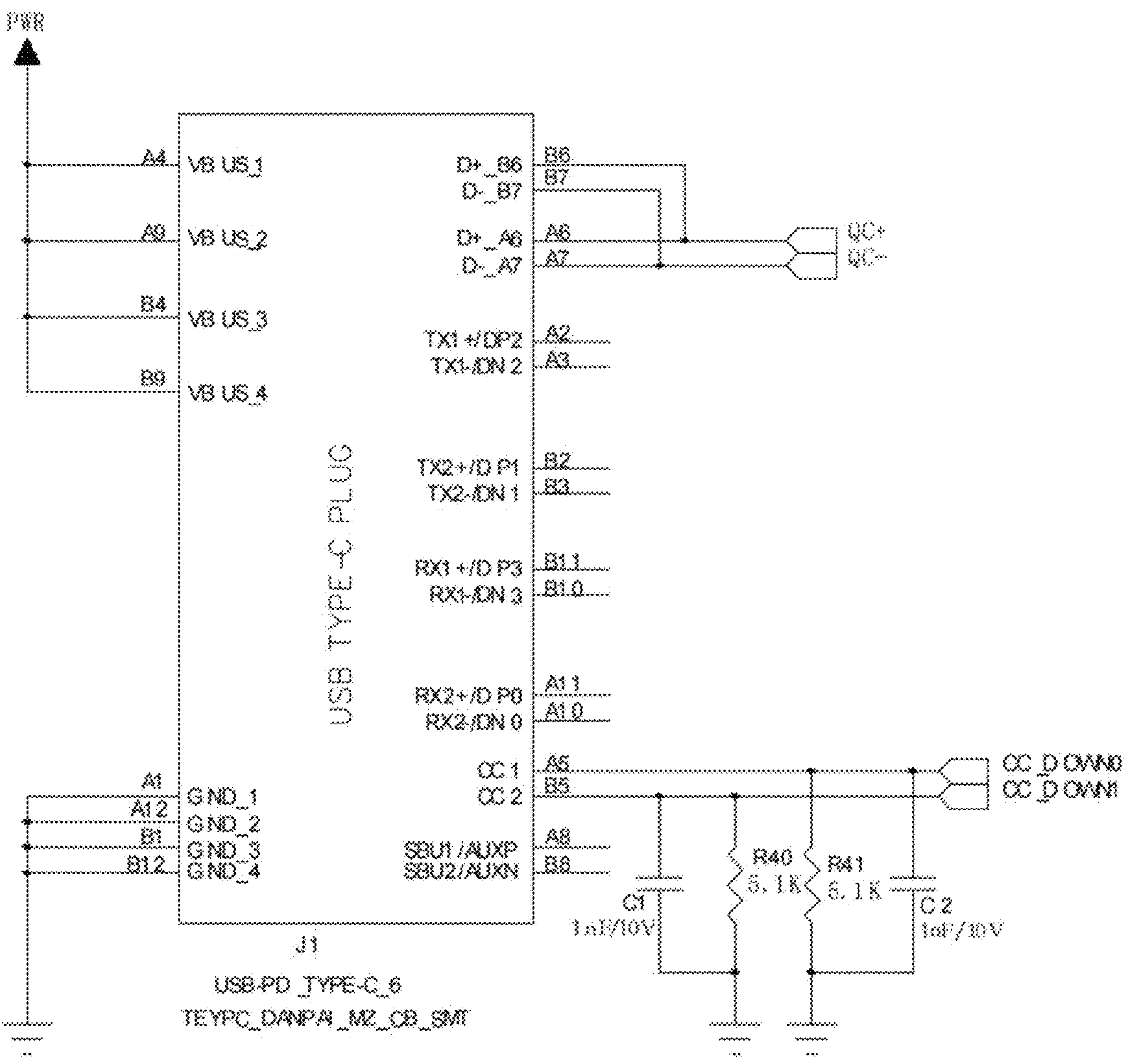
FIG. 2 is a schematic diagram of an interface of a jointer J1.
Figure 3:
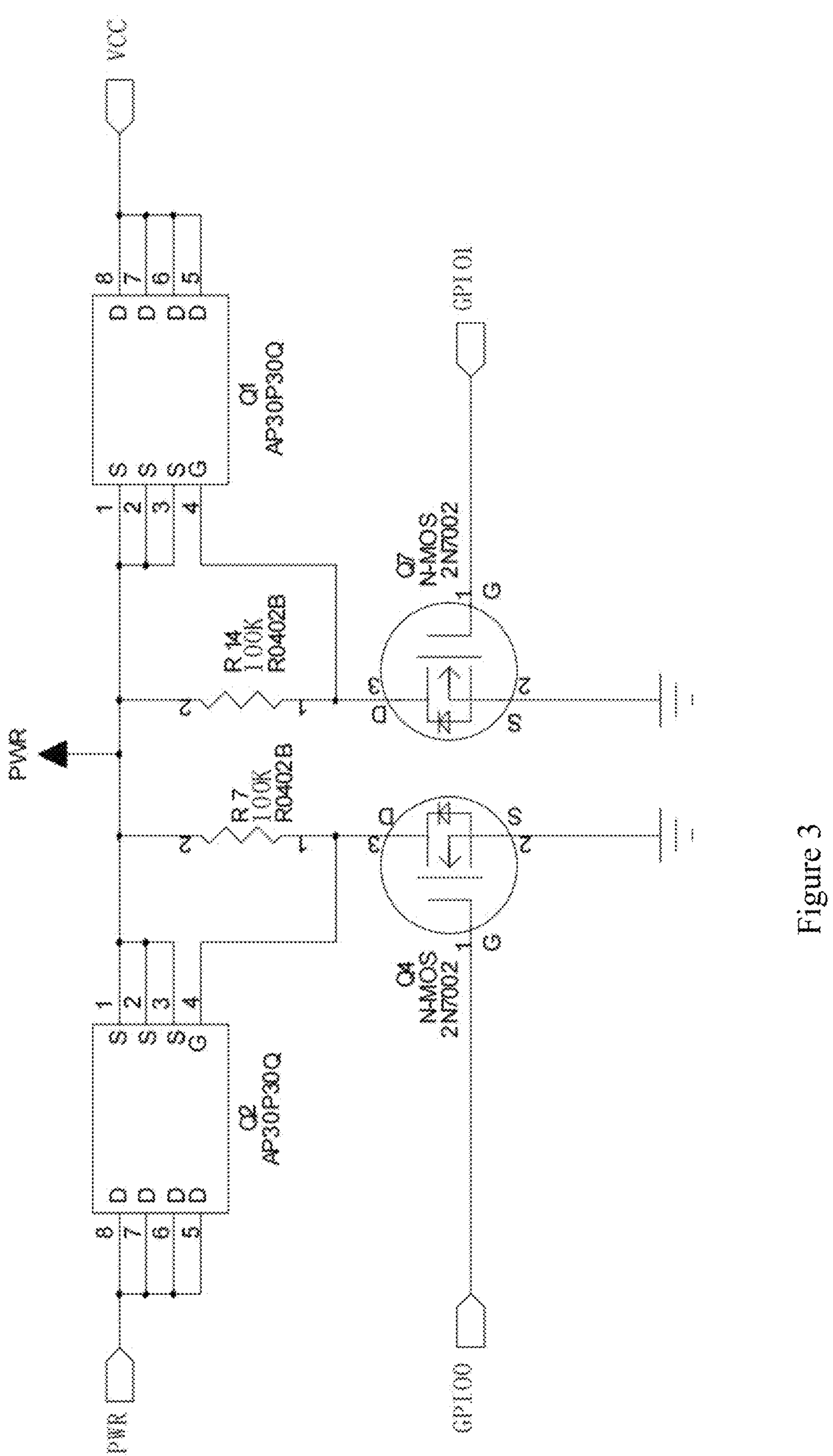
FIG. 3 is a circuit diagram of a power control circuit.
Figure 4:
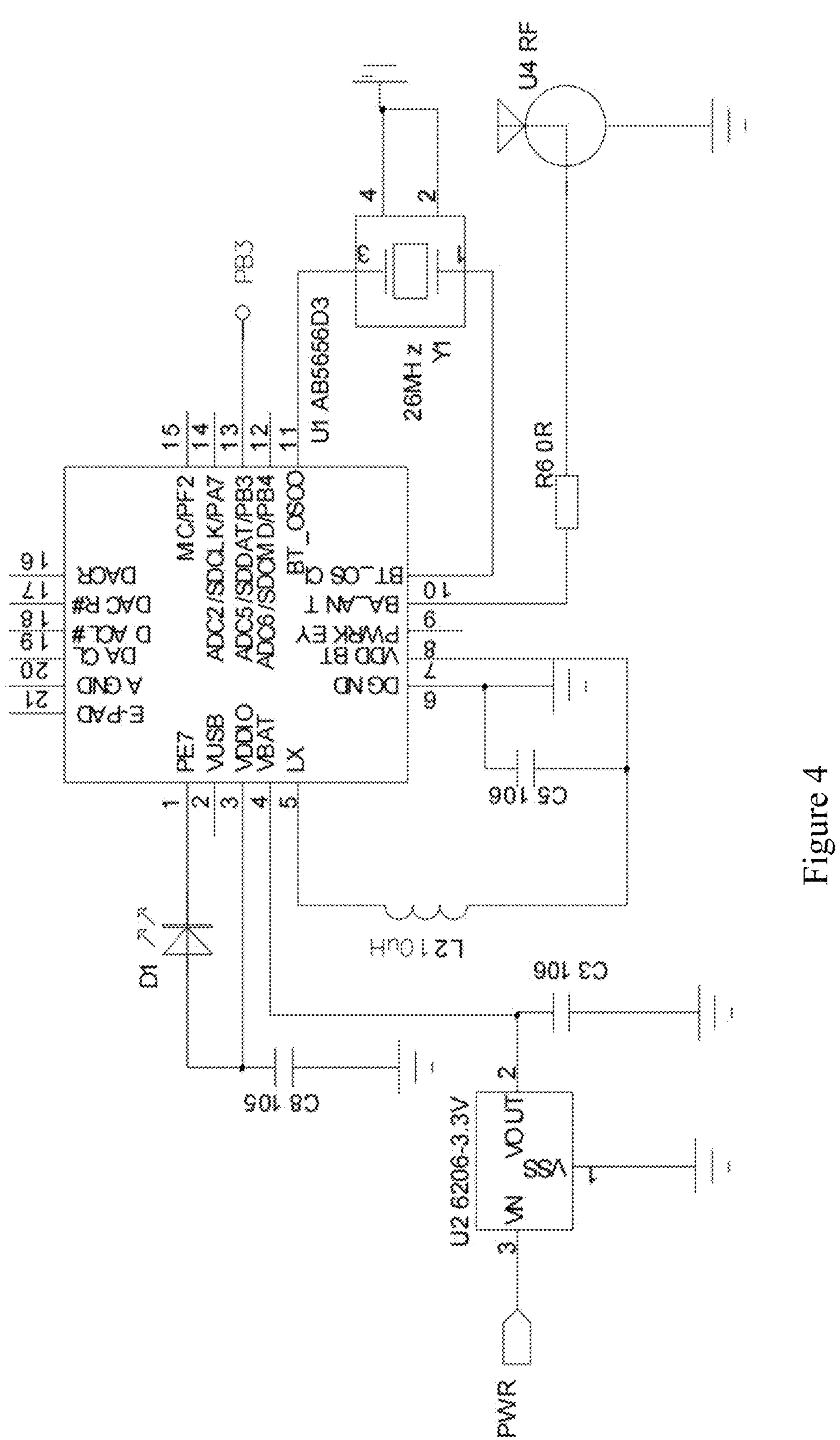
FIG. 4 is a diagram of a Bluetooth circuit.
Figure 5:
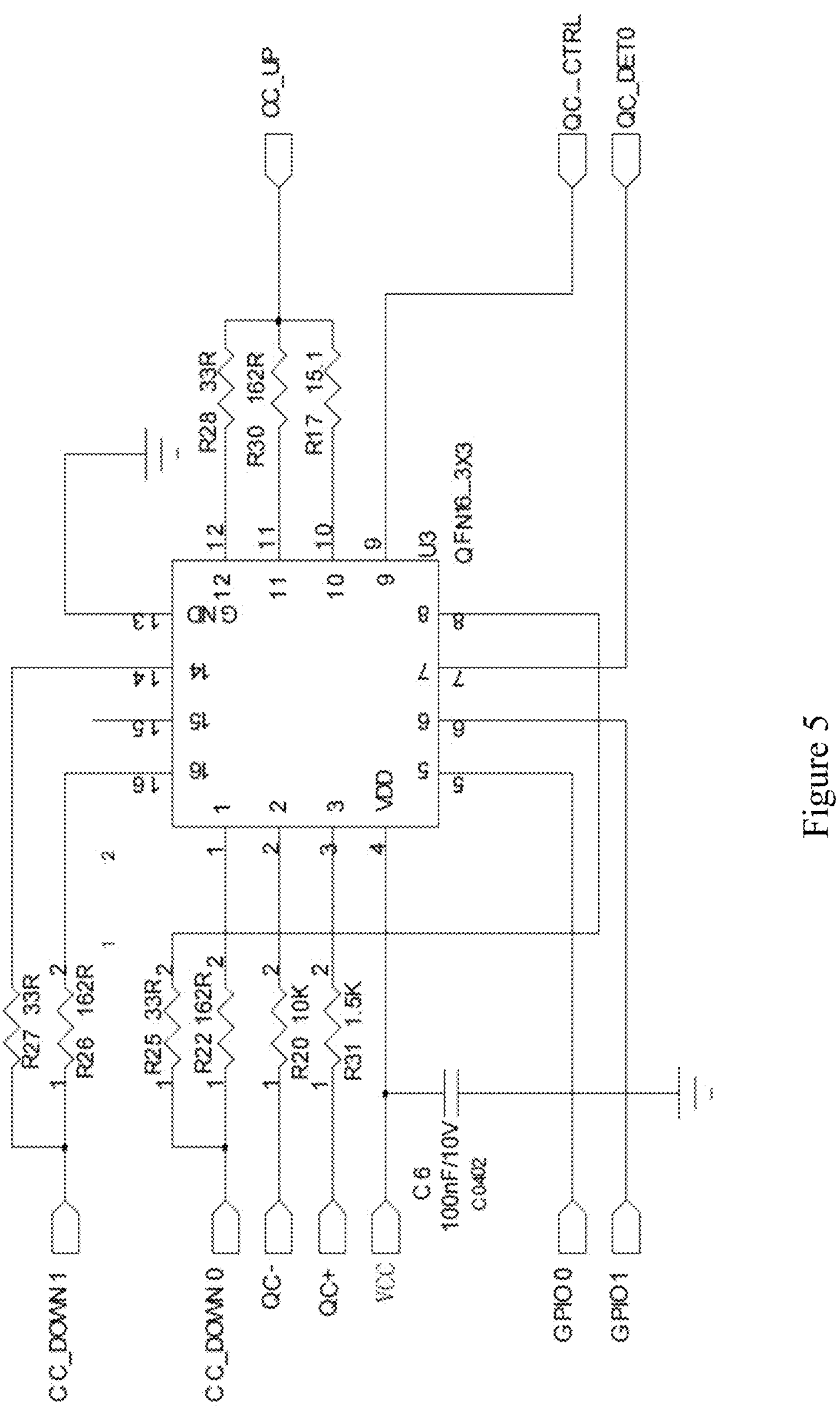
FIG. 5 is a diagram of a PD fast-charging circuit.
Figure 6:
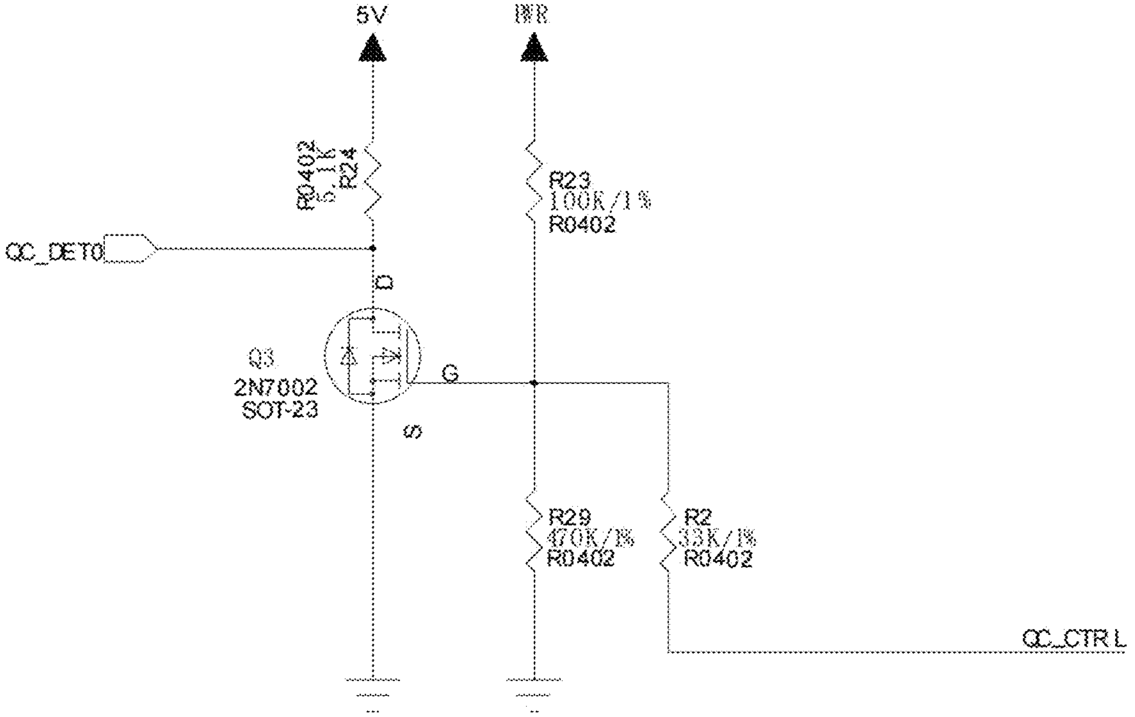
FIG. 6 is a diagram of a communication detection circuit.
Figure 7:
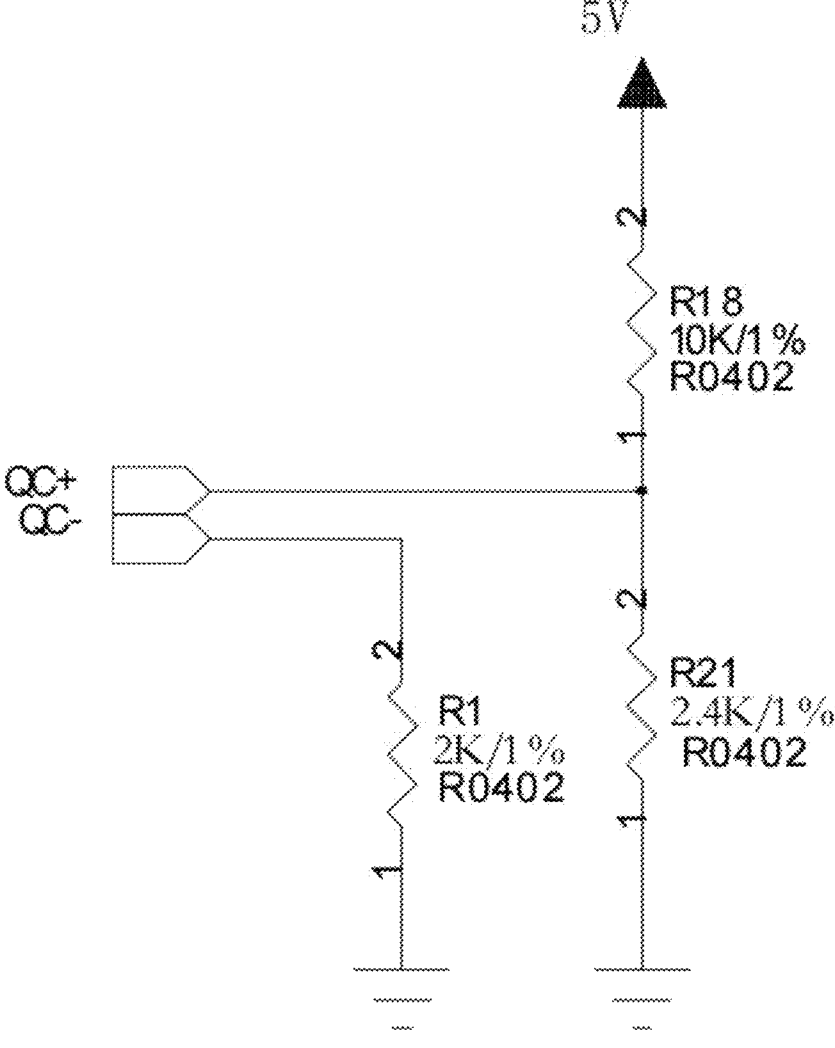
FIG. 7 is a diagram of a power detection circuit.
Figure 8:
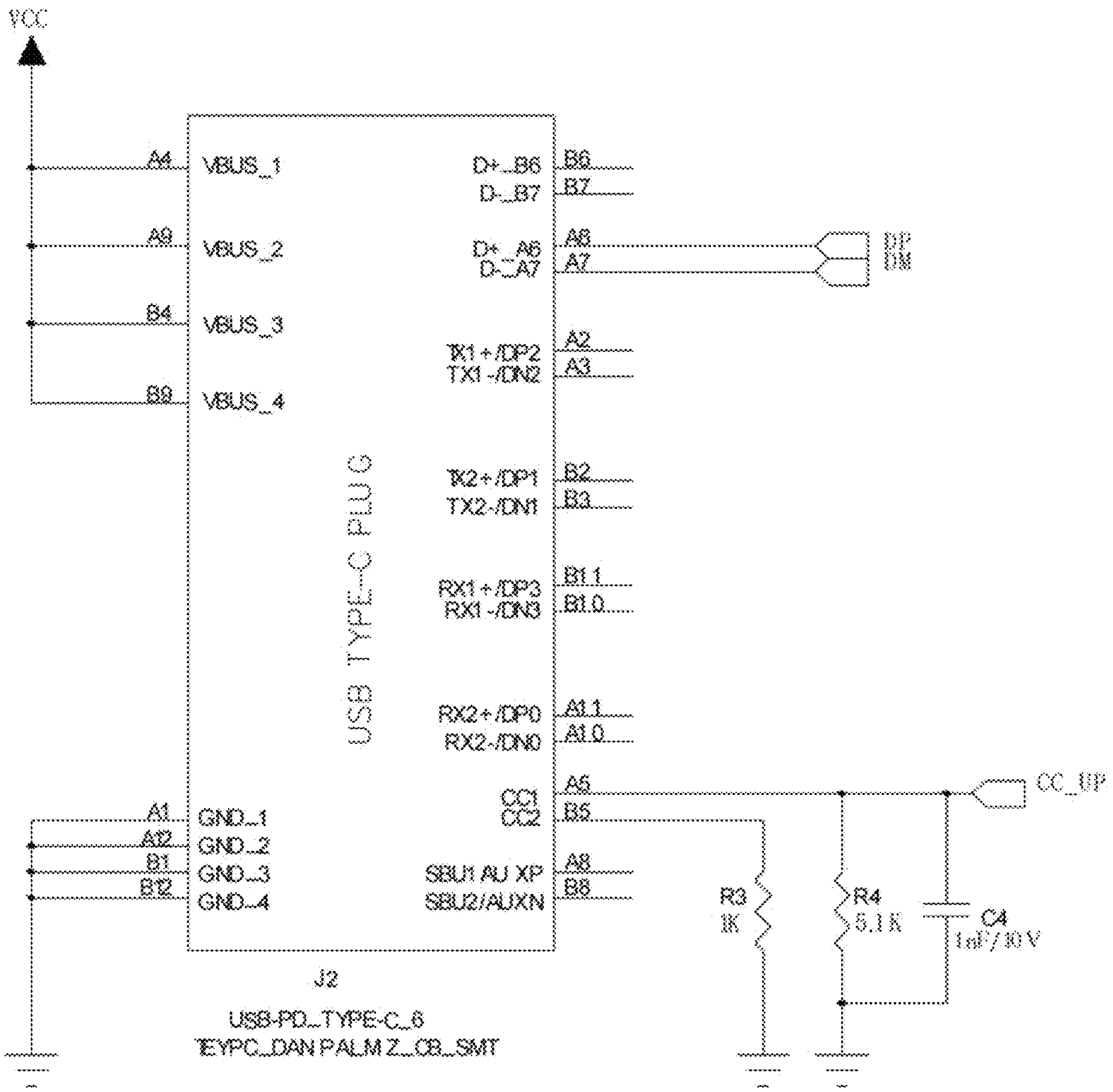
FIG. 8 is a schematic diagram of an interface of a jointer J2.

The present embodiment only shows an explanation of the present invention, and it is not a limitation to the present invention. The skilled in the art can make modifications to this embodiment as needed without making any creative contributions after reading this specification, which are always protected by the patent law as long as they are within the scope of the claims of the present invention.

The present invention provides a circuit combining functions of charging and activating motorcycle screen projection without an additional wearable device; the circuit is used under cooperation with a motorcycle and a mobile device; a Bluetooth circuit is arranged to replace the role of Bluetooth earphones to activate the motorcycle screen projection function. In this way, a rider can activate the motorcycle screen projection function without wearing Bluetooth earphones; the rider can select a Bluetooth wireless connection method to connect a mobile device with the motorcycle, or the rider can select a wired connection method to connect a mobile device with the motorcycle, in details, the rider can have the charging port of the motorcycle connected to the jointer J1 to activate the motorcycle screen projection function, and have the mobile device connected to the jointer J2 to get the mobile device recharged.

It should be specially noted that, the circuit combining functions of charging and activating motorcycle screen projection without an additional wearable device described in present invention is suitable for motorcycles whose screen projection function can be activated when two conditions are met at the same time, one of the two conditions is that the motorcycle must be connected to Bluetooth earphones, another of the two conditions is that the motorcycle must be connected to a mobile device via Bluetooth or a cable.

Referring to FIGS. 1 to 8, a circuit combining functions of charging and activating motorcycle screen projection without an additional wearable device includes a jointer J1, a jointer J2, a power control circuit, a PD fast-charging circuit, a communication detection circuit, a Bluetooth circuit and a power detection circuit.

The jointer J1 is used as an interface for the charging port of the motorcycle, which could be a USB Type-C interface; by connecting to the jointer J1, a rider is able to transmit an activation signal to the motorcycle, and the motorcycle is able to provide electronic power to the whole circuit; the jointer J2 is used as an interface to connect a mobile device to the motorcycle, which could be a USB Type-C interface as well; by connecting to the jointer J2, the rider is able to transmit signals and have the mobile device get charged; the PD fast-charging circuit is used for integration negotiation protocol and voltage transmission; the communication detection circuit is responsible for detecting a connection state among the mobile device, the motorcycle and the motorcycle screen projection; the power control circuit implements on-demand power supply; the Bluetooth circuit is used for connecting with the motorcycle; the power detection circuit ensures the safe operation of the whole circuit.

The PD fast-charging circuit includes a fast-charging chip U3; a pin A5 of the jointer J1 connects to one end of a first capacitor-resistor (RC) parallel circuit; another end of the first RC parallel circuit connects to a pin 1 of the fast-charging chip U3; a pin B5 of the jointer J1 connects to one end of a second RC parallel circuit; another end of the second RC parallel circuit connects to a pin 16 of the fast-charging chip U3; in this way, the PD fast-charging circuit and the charging port of the motorcycle share the PD protocol interaction; pin 5 and pin 6 of the fast-charging chip U3 are connected to the power control circuit to transmit a power supply control signal; pin 7 and pin 9 of the fast-charging chip U3 are connected to a communication detection circuit to receive a detection signal; the pin 10 to pin 12 of the fast-charging chip U3 connect to one end of a third RC parallel circuit; another end of the third RC parallel circuit connects to the pin A5 of the jointer J2; in this way, the PD fast-charging circuit and the mobile device execute a voltage negotiation, and then input a suitable charging voltage to the mobile device.

As an embodiment of the present invention, the fast-charging chip U3 is of model TI TPS65987D, package QFN16-3X3, support USB Type-C PD 3.0 protocol, and a 60 W maximum output power.

The communication detection circuit includes a field effect transistor Q3; a source electrode of the field effect transistor Q3 is grounded, a gate electrode of the field effect transistor Q3 is connected to the pin 9 of the fast-charging chip U3, and a drain electrode of the field effect transistor Q3 is connected to the pin 7 of the fast-charging chip U3. When the mobile device is connected to the motorcycle via the jointer J2, a PD negotiation signal triggers the pin 9 of the fast-charging chip U3 to output a high level voltage; the field effect transistor Q3 is conducted; the pin 7 of the fast-charging chip U3 is in a low level voltage; the fast-charging chip U3 recognizes that a device is connected; when the device is disconnected, the pin 9 of the fast-charging chip U3 output a low level voltage, the field effect transistor Q3 is misconducted; the pin 7 of the fast-charging chip U3 is in a high level voltage because of a pullup resistor, thereby the fast-charging chip U3 recognizes that no device is connected.

As an embodiment of the present invention, the field-effect transistor Q3 is model 2N7002 and with N-type Metal-Oxide-Semiconductor Field-Effect Transistor (N-type MOS transistor).

The power control circuit includes a field effect transistor Q1, a field effect transistor Q2, a field effect transistor Q4, a field effect transistor Q7, a resistor R7 and a resistor R14.

As an embodiment of the present invention, the field-effect transistor Q1 and the field-effect transistor Q2 are of model AP30P30Q and with P-type MOS transistor; the field-effect transistor Q1 and the field-effect transistor Q2 are adaptive to a high-voltage load; the field-effect transistor Q4 and the field-effect transistor Q7 is of model 2N7002 and with N-type MOS transistor.

The power control circuit includes an on-off circuit; the on-off circuit further includes the field effect transistor Q1 and the field effect transistor Q2; the power control circuit provides stable power supply for the jointer J2 and the Bluetooth circuit, specifically:

The working principle of the power control circuit supplying power to the jointer J2 is as follows: a source electrode of the field effect transistor Q1 is connected to the charging port of the motorcycle; the drain electrode of the field effect transistor Q1 is connected to the plurality of power supply pins of the jointer J2; and the gate electrode of the field effect transistor Q1 is connected to the drain electrode of a field effect transistor Q7; the source electrode of the field-effect transistor Q7 is grounded; and the gate electrode of the field effect transistor Q7 is connected to the pin 6 of the fast-charging chip U3; the resistor R14, the source electrode and the gate electrode of the field-effect transistor Q1 are connected in parallel so as to stabilize the voltage of the gate electrode of the field-effect transistor Q1. When the fast-charging chip U3 outputs a high-level voltage, the field effect transistor Q7 is conducted; the voltage level at the gate electrode of the field effect transistor Q1 is pulled down; and the field effect transistor Q1 is conducted to supply power to the jointer J2.

The working principle of the power control circuit supplying power to the Bluetooth circuit is as follows: the source electrode of field effect transistor Q2 is connected to the charging port of the motorcycle; the drain electrode of field effect transistor Q2 is connected to the Bluetooth circuit; and the gate electrode of field effect transistor Q2 is connected to the drain electrode of field effect transistor Q4; the source electrode of field effect transistor Q4 is grounded; and the gate electrode of field-effect transistor Q4 is connected to the pin 5 of fast-charging chip U3; the resistor R7 is connected in parallel to the source electrode and the gate electrode of the field-effect transistor Q2 to stabilize the voltage at the gate electrode of the field-effect transistor Q2. When the fast-charging chip U3 outputs a high-level voltage, the field effect transistor Q4 is conducted; the voltage level at the gate electrode of the field effect transistor Q2 is pulled down; and the field effect transistor Q2 is conducted to supply power to the Bluetooth circuit.

The Bluetooth circuit includes a buck regulator U2, a Bluetooth chip U1, a crystal oscillator Y1, a radio frequency (RF) front-end chip U4, and a light emitting diode (LED) D1; a pin 3 of buck regulator U2 is connected to the power control circuit; the pin 2 of buck regulator U2 outputs 3.3V voltage to the pin 4 of Bluetooth chip U1; the pin 1 of buck regulator U2 is grounded; the pin 1 of Bluetooth chip U1 is connected to the LED D1; the LED D1 is controlled by the pin 13 of Bluetooth chip U1; the LED D1 flashes during matching proceedings, and then the LED D1 keeps being on after matching successfully; the pin 10 and pin 11 of Bluetooth chip U1 are connected to the crystal oscillator Y1, the crystal oscillator Y1 outputs a stable time signal and frequency primary standard so as to make the communication system frequency stable; the pin 9 of Bluetooth chip U1, the resistor R6 and the RF front-end chip U4 are connected in series; the RF front-end chip U4 amplifies Bluetooth signals, makes the Bluetooth signals smoothing, and then makes the Bluetooth chip U1 and the Bluetooth module inside the charging port of the motorcycle connected.

As an embodiment of the present invention, the buck regulator U2 is of model 6206-3.3V, with 5V input voltage and 3.3V output voltage; the buck regulator U2 supplies power for the Bluetooth chip U1; the Bluetooth chip U1 is of model AB5656D3, which supports Bluetooth 5.0 and Hands-Free Profile (HFP) protocol, Advanced Audio Distribution Profile (A2DP) protocol, Audio-Video Remote Control Profile (AVRCP) protocol; the RF front-end chip U4 is used for signal amplification and filtering.

The power detection circuit includes a resistor R1, resistor R18, and resistor R21. One end of the resistor R1 is grounded, another end of the resistor R1 is connected to pin A7 and pin B7 of the jointer J1 to detect the input voltage of the motorcycle; one end of the resistor R18, the resistor and the drain electrode of field-effect transistor Q3 are connected in series; another end of the resistor R18 is connected to the resistor R21 and then grounded; the pin A6 and pin B6 of jointer J1 are connected to the intermediate node between the resistor R18 and the resistor R21; the detection signal is sent to the pin 7 of fast-charging chip U3 through the drain electrode of field-effect transistor Q3; the fast-charging chip U3 has a built-in voltage comparator; when the detection voltage exceeds 5V±0.5V, the fast-charging chip U3 outputs a signal to turn the power control circuit off.

As an embodiment of the present invention, both the jointer J1 and jointer J2 are USB Type-C interfaces that support data transmission and power supply; the pin A5 and pin B5 of the jointer J1 and jointer J2 are used for PD protocol negotiation; pin A7 and pin B7 of the jointer J1 and jointer J2 are used for motorcycle power supply detection; pin A6 and pin B6 of the jointer J1 and jointer J2 are used for signal transmission detection; pin A4, pin B4, pin A9 and pin B9 of the jointer J1 and jointer J2 are used for power output; pin A1, pin B1, pin A12 and pin B12 of the jointer J1 and jointer J2 are grounded.

The working principle of the circuit combining functions of charging and activating motorcycle screen projection without an additional wearable device in the present invention as follows:

In the communication detection circuit, the field effect transistor Q3 detects whether a mobile device is connected to jointer J2 in real time, and feeds back the signal to the fast-charging chip U3; then the fast-charging chip U3 outputs the signal through the pin 5 and pin 6 of the fast-charging chip U3; the field effect transistor Q4 and Q7 of the power control circuit turns on or turns off depending on the signal received, thereby controlling the field effect transistor Q1 to supply power to jointer J2, and controlling the field effect transistor Q2 to supply power to the Bluetooth circuit;

the power detection circuit monitors the input voltage and feedback voltage signal to the fast-charging chip U3 in real time; when the fast-charging chip U3 receives an abnormal voltage signal, the PD fast-charging chip U3 cuts off the power.

Two application scenarios of the circuit in the present invention are as follows:

- A first application scenario is wireless connection activation. Before activating the motorcycle screen projection, the jointer J1 is required to connect to the motorcycle; when the jointer J1 is trying to connect to the motorcycle, the LED D1 flashes; the Bluetooth chip U1 in the Bluetooth circuit sends Bluetooth signals via the RF front-end chip U4; the motorcycle system detects the Bluetooth signals sent by the RF front-end chip U4 and then matches, thereby achieving Bluetooth protocol interaction between the motorcycle and the Bluetooth chip U1; when the motorcycle is successfully connected to the Bluetooth chip U1, the LED D1 constantly turns on; then the rider use the mobile device to search for the Bluetooth signal of the motorcycle, and the has the motorcycle and the mobile device Bluetooth matched so as to activate the screen projection function;
- A second application scenario is a wired connection activation. Before activating the motorcycle screen projection, the jointer J1 is required to connect to the motorcycle; when the jointer J1 is trying to connect to the motorcycle, the LED D1 flashes; the Bluetooth circuit starts working; the Bluetooth chip U1 outputs a Bluetooth signal to the motorcycle via the RF front-end chip U4; the motorcycle system detects the Bluetooth signal sent by the RF front-end chip U4 and then matches, thereby achieving Bluetooth protocol interaction between the motorcycle and the Bluetooth chip U1; when the motorcycle is successfully connected to the Bluetooth chip U1, the LED D1 constantly turns on; then the mobile device is required to connect to the jointer J2; the pin VBUS (Voltage Bus) of the jointer J1 and the jointer J2 transmit power; the pin PD and pin MD transmit data signals, in this way, the rider activates the motorcycle screen projection function. In this application scenario, the jointer J2 connects to the mobile devices; the jointer J2 charges for the mobile device via the PD fast-charging circuit.

Figure 9:
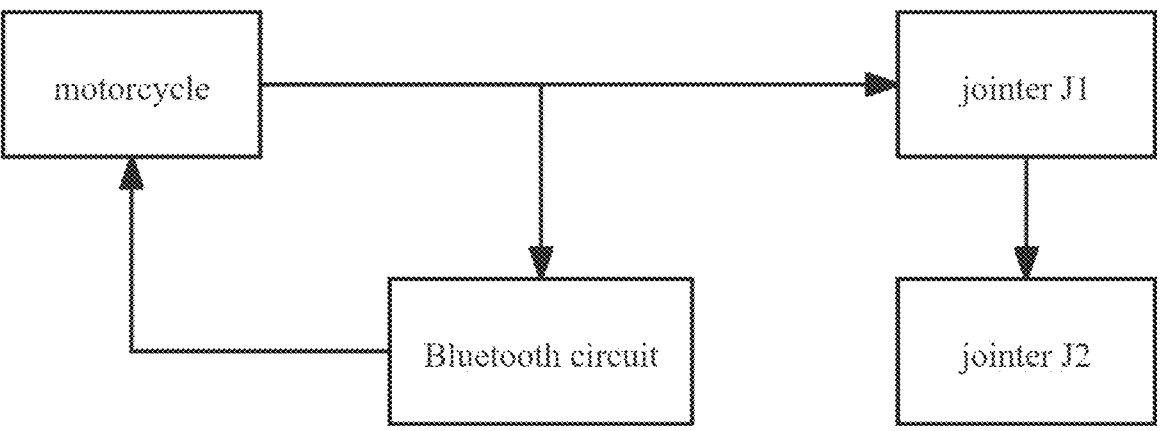
FIG. 9 is another diagram showing a circuit combining functions of charging and activating motorcycle screen projection without an additional wearable device in second embodiment.

Referring to FIG. 9, as another embodiment of the present invention, the circuit combining functions of charging and activating motorcycle screen projection without an additional wearable device includes a jointer J1, a jointer J2 and a Bluetooth circuit; the Bluetooth circuit is powered by the jointer J1, and then the Bluetooth chip U1 is connected to the motorcycle via Bluetooth; in combination with a Bluetooth connection or a wired connection to a mobile device, the motorcycle screen projection function is activated. The rider is able to have the mobile device connected to the jointer J2 so as to get the mobile device recharged. In this embodiment, only a traditional normal charging mode is supported, yet no PD fast-charging.

It could be understood that under the guidance of the above embodiments, those skilled in the art can combine various implementation methods in the above embodiments to obtain technical solutions of multiple implementation methods.

The above description is only a preferred embodiment of the present invention and is not to limit the present invention. Any modifications, equivalent substitutions and improvements made within the spirit and principles of the present invention should be included in the scope of protection of the present invention.

The invention claimed is:

1. A circuit combining functions of charging and activating motorcycle screen projection without an additional wearable device, comprises a jointer J1, a jointer J2, a power control circuit and a Bluetooth circuit; the jointer J1 is electrically connected to a charging port of a motorcycle; an input end of the power control circuit is electrically connected to the charging port of the motorcycle; the power control circuit has two voltage-output ends, one end of the two voltage output-ends is electrically connected to the Bluetooth circuit; an other end of the two voltage output-ends is electrically connected to the jointer J2; the jointer J2 is connected to a mobile device; the circuit further comprises a Power Delivery (PD) fast-charging circuit and a communication detection circuit; the PD fast-charging circuit is used for integration negotiation protocol and voltage transmission; the communication detection circuit is responsible for detecting a connection state among the mobile device, the motorcycle and a motorcycle screen projection; when the Bluetooth circuit establishes a communication connection with the motorcycle and when the mobile device establishes a communication connection with the Bluetooth circuit, the motorcycle screen projection is activated; or when the jointer J1 connects to the motorcycle and when the jointer J2 connects to the mobile device, the motorcycle screen projection is activated, at the same time, the motorcycle is capable of providing a PD fast charging to the mobile device.

2. The circuit according to claim 1, wherein the PD fast-charging circuit comprises a fast-charging chip U3; a pin A5 of the jointer J1 connects to one end of a first capacitor-resistor (RC) parallel circuit; an other end of the first RC parallel circuit connects to a pin 1 of the fast-charging chip U3; a pin B5 of the jointer J1 connects to one end of a second RC parallel circuit; an other end of the second RC parallel circuit connects to a pin 16 of the fast-charging chip U3; a pin 5 and a pin 6 of the fast-charging chip U3 connect to the power control circuit; a pin 7 and a pin 9 of the fast-charging chip U3 connect to the communication detection circuit; pin 10 to pin 12 of the fast-charging chip U3 connect to one end of a third RC parallel circuit; an other end of the third RC parallel circuit connects to the pin A5 of the jointer J2.

3. The circuit according to claim 2, wherein the communication detection circuit comprises a field effect transistor Q3; a source electrode of the field effect transistor Q3 is grounded; a gate electrode of the field effect transistor Q3 connects to the pin 9 of the fast-charging chip U3; a drain electrode of the field effect transistor Q3 connects to the pin 7 of the fast-charging chip U3.

4. The circuit according to claim 2, wherein the power control circuit comprises a field effect transistor Q1, a field effect transistor Q2, a field effect transistor Q4, a field effect transistor Q7, a resistor R7 and a resistor R14;

wherein a source electrode of the field-effect transistor Q1 connects to a charging port of the motorcycle screen projection; a drain electrode of the field-effect transistor Q1 connects to a plurality of power supply pins of the jointer J2; a gate electrode of the field-effect transistor Q1 connects to a drain electrode of the field-effect transistor Q7; a source electrode of the field-effect transistor Q7 is grounded; a gate electrode of the field-effect transistor Q7 connects to the pin 6 of the fast-charging chip U3; the resistor R14 is connected in parallel to the source electrode of the field-effect transistor Q1 and the gate electrode of the field-effect transistor Q1; and wherein a source electrode of the field-effect transistor Q2 connects to the charging port of the motorcycle screen projection; a drain electrode of the field-effect transistor Q2 connects to the Bluetooth circuit; a gate electrode of the field-effect transistor Q2 connects to a drain electrode of the field-effect transistor Q4; a source electrode of the field effect transistor Q4 is grounded; a gate electrode of the field effect transistor Q4 connects to the pin 5 of the fast-charging chip U3; the resistor R7 is connected in parallel to the source electrode of the field effect transistor Q2 and the gate electrode of the field effect transistor Q2.

5. The circuit according to claim 3, wherein the Bluetooth circuit comprises a buck regulator U2, a Bluetooth chip U1, a crystal oscillator Y1, a radio frequency (RF) front-end chip U4 and a light-emitting diode (LED) D1; a pin 3 of the buck regulator U2 connects to the power control circuit; a pin 2 of the buck regulator U2 connects to a pin 4 of the Bluetooth chip U1; a pin 1 of the buck regulator U2 is grounded; a pin 1 of the Bluetooth chip U1 connects to the LED D1, pin 10 and pin 11 of the Bluetooth chip U1 connect to the crystal oscillator Y1; a pin 9 of the Bluetooth chip U1, a resistor R6 and the RF front-end chip U4 are connected in series.

6. The circuit according to claim 1, wherein a power detection circuit comprises a resistor R1, a resistor R18 and a resistor R21; one end of the resistor R1 is grounded; an other end of the resistor R1 is connected to a pin A7 and a pin B7 of the jointer J1; one end of the resistor R18, a resistor R24 and the drain resistor of the field effect transistor Q3 are connected in series; an other end of the resistor 18 connect to the resistor R21 in series and then is grounded; a pin A6 and a pin B6 of the jointer J1 are connected to an intermediate node between the resistor R18 and the resistor R21.

* * * * *